US012785232B2

(12) United States Patent
Zhou et al.

(10) Patent No.: US 12,785,232 B2
(45) Date of Patent: Nov. 3, 2026

(54) LOWER PLASTIC MEMBER, TOP COVER ASSEMBLY, ENERGY STORAGE DEVICE AND ELECTRICAL EQUIPMENT

(71) Applicant: Hithium Tech HK Limited, Kowloon (HK)

(72) Inventors: Wenyang Zhou, Fujian (CN); Yongfeng Xiong, Fujian (CN); Ming Yang, Fujian (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 5 days.

(21) Appl. No.: 18/119,378

(22) Filed: Mar. 9, 2023

(65) Prior Publication Data

US 2024/0162589 A1 May 16, 2024

(30) Foreign Application Priority Data

Nov. 11, 2022 (CN) ......................... 202211415655.6

(51) Int. Cl.

*H01M 50/636* (2021.01)
*H01M 50/103* (2021.01)
*H01M 50/15* (2021.01)
*H01M 50/242* (2021.01)
*H01M 50/30* (2021.01)
*H01M 50/593* (2021.01)
*H01M 50/645* (2021.01)

(52) U.S. Cl.

CPC ....... *H01M 50/636* (2021.01); *H01M 50/103* (2021.01); *H01M 50/15* (2021.01); *H01M 50/394* (2021.01); *H01M 50/593* (2021.01); *H01M 50/645* (2021.01); *H01M 50/242* (2021.01)

(58) Field of Classification Search

CPC .. H01M 50/636; H01M 50/103; H01M 50/15; H01M 50/394; H01M 50/593; H01M 50/645; H01M 50/242

See application file for complete search history.

(56) References Cited

U.S. PATENT DOCUMENTS

| | | | | |
|---|---|---|---|---|
| 2017/0098816 A1* | 4/2017 | Guen | .................. | H01M 50/147 |
| 2022/0320642 A1* | 10/2022 | Cai | ..................... | H01M 50/531 |
| 2023/0032002 A1* | 2/2023 | Tang | ..................... | H01M 50/14 |

FOREIGN PATENT DOCUMENTS

| | | |
|---|---|---|
| CN | 203445184 U | 2/2014 |
| CN | 208385511 U | 1/2019 |

(Continued)

OTHER PUBLICATIONS

English translation of Xu et al. (CN-113270667-A). (Year: 2021).*

(Continued)

*Primary Examiner* — Haroon S. Sheikh
*Assistant Examiner* — Drew C Newman
(74) *Attorney, Agent, or Firm* — Scully, Scott, Murphy & Presser, P.C.

(57) ABSTRACT

The present disclosure discloses a lower plastic member, a top cover assembly, an energy storage device, and electrical equipment, which can solve the problem of damage to an electrode assembly caused by the fact that a lower plastic member collides with the electrode assembly device and other structures arranged on the battery cell, and prolong the service life of the energy storage device and electrical equipment.

15 Claims, 8 Drawing Sheets

(56) References Cited

FOREIGN PATENT DOCUMENTS

| | | | |
|---|---|---|---|
| CN | 212366148 | U | 1/2021 |
| CN | 112713342 | A | 4/2021 |
| CN | 213340535 | U | 6/2021 |
| CN | 213601921 | U | 7/2021 |
| CN | 113270667 | A | 8/2021 |
| CN | 213989014 | U | 8/2021 |
| CN | 216354469 | U | 4/2022 |
| CN | 217009370 | U | 7/2022 |
| CN | 217134507 | U | 8/2022 |
| CN | 217468721 | U | 9/2022 |
| CN | 115588817 | A | 1/2023 |
| CN | 116073064 | A | 5/2023 |
| EP | 4586384 | A1 | 7/2025 |
| WO | 2020151473 | A1 | 7/2020 |
| WO | 2022121244 | A1 | 6/2022 |

OTHER PUBLICATIONS

English translation of He et al. (CN-213601921-U). (Year: 2021).*
English translation of Tan et al. (CN-213340535-U). (Year: 2021).*
English translation of Xu et al. (CN-217009370-U). (Year: 2022).*
Notice of Granting Invention Patent Right dated Feb. 16, 2023 received in Chinese patent Application No. CN 202211415655.6.
Notice of First Review Opinion dated Jan. 18, 2023 received in Chinese Patent Application No. CN 202211415655.6.
International Search Report dated Jul. 24, 2023 received in International Application No. PCT/CN2022/131524.
Partial supplementary European search report dated Feb. 19, 2026 received in European Patent Application No. 22964884.5.
Search report dated Feb. 7, 2023 received in Chinese Patent Application No. 202211415655.6.

* cited by examiner

LOWER PLASTIC MEMBER, TOP COVER ASSEMBLY, ENERGY STORAGE DEVICE AND ELECTRICAL EQUIPMENT

CROSS-REFERENCE TO RELATED APPLICATION

The application claims priority to Chinese Patent Application No.: CN202211415655.6, filed on Nov. 11, 2022, the entire disclosure of which are incorporated herein by reference for all purposes.

FIELD

The present disclosure relates to the technical field of energy storage, and in particular, to a lower plastic member, a top cover assembly, an energy storage device and electrical equipment.

BACKGROUND

During the use of batteries, when a battery is overcharged, overdischarged, short-circuited or used in a harsh environment (high temperature, high humidity, high pressure and low pressure environments), a large amount of gas will be generated inside the battery, and the temperature of the battery will rise sharply. As a result, an internal pressure of the battery increases, which will cause a certain danger to a user. In the related technology, in order to ensure the safety of a battery, an explosion-proof hole is formed in a top cover assembly of the battery, and an explosion-proof valve is covered at the explosion-proof hole. When a pressure inside the battery reaches a threshold, pressure relief can be performed on gas through the explosion-proof valve, so as to reduce the danger of explosion of the battery.

However, when the battery expands or moves during operation, an electrode assembly will approach a lower plastic member of a top cover assembly. As a result, the electrode assembly and other structures arranged on the electrode assembly will collide with the lower plastic member, causing damage to the battery cell.

SUMMARY

Embodiments of the present disclosure discloses a lower plastic member, a top cover assembly, an energy storage device, and electrical equipment, which can solve the problem of damage to an electrode assembly caused by the fact that a lower plastic member collides with the electrode assembly in the energy storage device and other structures arranged on the battery cell.

In order to achieve the above object, in a first aspect, the present disclosure discloses a lower plastic member, applied to a top cover assembly, the lower plastic member includes a first surface and a second surface facing away from the first surface; the second surface is formed with a groove; the first surface is provided with a first boss protruding therefrom; the first boss faces away from the groove, the first boss is provided with a first air vent; the first air vent communicates with the groove;

the first surface is also provided with a second boss protruding therefrom; the second boss is provided with a second air vent communicating with the groove; and a height of the second boss protruding from the first surface is less than a height of the first boss protruding from the first surface.

In the lower plastic member provided in the present disclosure, the first boss is arranged on the first surface a of the lower plastic member, so that when the electrode assembly expands or moves, the first boss can limit electrode assembly to still form a buffer space between the lower plastic member and the battery cell, and an electrode assembly of the battery cell(such as a tab) can be located in the buffer space, thus avoiding the damage to the electrode assembly caused by following fact: in the transportation process of the battery cell, the lower plastic member will collide with the electrode assembly and break or cut the tab on the electrode assembly due to mechanical vibration, and achieving an effect of protecting the battery cell, which is conductive to prolonging the service life of the energy storage device. The lower plastic member is also provided with the second boss, and the height of the second boss protruding from the first surface a is defined to be less than that of the first boss protruding from the first surface, so that when the electrode assembly expands or moves to abut against the first boss to block the first air vent, a space can still be reserved between the second boss and the battery cell. The second air vent on the second boss will not be blocked by the battery cell, and the gas in the housing can still be relieved through the second air vent, thus ensuring that the gas in the housing can be discharged to the explosion-proof valve at the explosion-proof hole for pressure relief and explosion proofing to ensure the pressure relief effect of the explosion-proof valve.

In addition, in a sample test, the applicant has found that the explosion-proof valve needs to reach its explosion pressure value before achieving blasting and pressure relief, rather than achieving blasting once the electrode assembly generates gas. Therefore, by means of forming the groove at the position of the second surface corresponding to the first boss, and the groove communicates with the first air vent.

The gas in the housing can be accumulated into the groove through the first air vent before the pressure in the housing reaches a blasting pressure value of the explosion-proof valve. On the one hand, the pressure in the housing can be reduced, and the electrode assembly can be avoided from working in a high-pressure environment all the time, which is conducive to enhancing the explosion protection effect and improving the safety of the energy storage device. On the other hand, the impact of gas mixing in electrolyte on the conductivity and service life of the electrode assembly can be avoided, which is conducive to ensuring the use stability and service life of the battery cell.

Further, the groove is arranged at the position of the second surface corresponding to the first boss. Although there is a groove, the position of the lower plastic member that is provided with the groove will not be too thin. It can be seen that the first surface of the lower plastic member is provided with the first boss, and the second surface is provided with the groove at the position corresponding to the first boss, so that the explosion protection effect can be enhanced while ensuring the intensity of the lower plastic member and protecting the battery cell, which is then conductive to improving the use safety of the energy storage device; and the use stability and service life of the electrode assembly can also be guaranteed.

As an alternative embodiment, in an embodiment of the first aspect of the present disclosure, the first air vent penetrates through a surface of the first boss facing away from the lower plastic member, and a proportion of an air permeability area of the first air vent to an area of the surface of the first boss is greater than or equal to 15% and less than or equal to 25%; and/or, the second air vent penetrates through a surface of the second boss facing away from the lower plastic member; and a ratio of an air permeability area of the second air vent on the surface of the second boss to the air permeability area of the first air vent on the surface of the first boss is 0.88 to 1.22.

By means of controlling the proportion of the air permeability area of the first air vent on the surface with the first boss to be within the above range, it can be ensured that an overall width of the first air vent is greater than a width of the explosion-proof valve in a width direction of the lower plastic member. By means of controlling the ratio of the air permeability area of the second air vent on the surface with the second boss to the air permeability area of the first air vent on the surface with the first boss to be within the above range, it can be ensured that a sum of an overall length of the first air vent and an overall length of the second air vent is greater than a length of the explosion-proof valve in a lengthwise direction of the lower plastic member, so as to ensure that the explosion-proof valve can select an appropriate effective explosion-proof area, improve the explosion prevention effect of the explosion-proof valve, and ensure the strength of a region of the lower plastic member corresponding to the explosion-proof valve.

As an alternative embodiment, in an embodiment of the first aspect of the present disclosure, the lower plastic member includes a first edge and a second edge, the first edge and the second edge are respectively located at both ends of the lower plastic member along a lengthwise direction of the lower plastic member, the first surface is also provided with a third boss and a fourth boss protruding therefrom, the third boss is arranged on the first surface and extends along the first edge, the fourth boss is arranged on the first surface and extends along the second edge, the first boss is located between the third boss and the fourth boss. Thus, when the electrode assembly expands or moves, the first boss, the third boss and the fourth boss all can stop and limit the battery cell. In this way, the electrode assembly can be stopped and limited by the middle portion and two opposite edges of the lower plastic member, making the stop and limit effect better, thus avoiding the damage to the electrode assembly caused by following fact: in the transportation process of the battery cell, the lower plastic member will collide with the electrode assembly and break or cut the tab on the electrode assembly due to mechanical vibration, and achieving a better protection effect, which is conductive to further prolonging the service life of the energy storage device.

Further, it can be understood that when the third boss and the fourth boss are arranged on the lower plastic member, the third boss and the fourth boss can play a role in improving the strength of the lower plastic member. Based on this, the third boss extends along the first edge of the lower plastic member, the fourth boss extends along the second edge of the lower plastic member, and the first edge and the second edge are two opposite edges of the rectangular lower plastic member, so that the third boss and the fourth boss can improve the strength of the lower plastic member on the two opposite edges of the lower plastic member, and the improvement effect is better.

As an alternative embodiment, in an embodiment of the first aspect of the present disclosure, the third boss has a first surface arranged far from the first surface, and a second surface connected with an edge of the first surface; the second surface is arranged toward the first boss; the first surface is provided with a first slot penetrating through the second surface, and a first chamfer is arranged at a junction of a wall surface of the first slot and the second surface;

the fourth boss has a third surface arranged far from the first surface, and a fourth surface connected with an edge of the third surface; the fourth surface is arranged toward the first boss; the third surface is provided with a second slot penetrating through the fourth surface; and a second chamfer is arranged at a junction of a wall surface of the second slot and the fourth surface.

It can be seen from the foregoing that when the electrode assembly expands or moves, the electrode assembly will be stopped and limited by the third boss and the fourth boss, or during assembling, the electrode assembly may abut against the third boss and the fourth boss. By means of arranging the first chamfer at the junction of the wall surface of the first slot and the second surface, and arranging the second chamfer at the junction of the wall surface of the second slot and the fourth surface, sharp corners can be formed at the junction of the wall surface of the first slot and the second surface as well as at the junction of the wall surface of the second slot and the fourth surface, and will cut the tab of the battery cell. Therefore, the first chamfer and the second chamfer can play a role of protecting the tab.

As an alternative embodiment, in an embodiment of the first aspect of the present disclosure, the top cover assembly includes a top cover plate and a sealing member; the top cover plate is provided with an injection hole penetrating therethrough, and the sealing member seals the injection hole; the lower plastic member further includes a blocking piece; the lower plastic member is connected to the top cover plate; the first surface faces away from the top cover plate; the lower plastic member is provided with a first through hole corresponding to the injection hole; the first through hole penetrates through the first surface and the second surface; the blocking piece is arranged at the first through hole; and the blocking piece is connected to the first surface.

The blocking piece is arranged to block the injection hole. On the one hand, when electrolyte is injected into the housing, the tab of the electrode assembly can be prevented from entering the injection hole to block the injection hole, so as to ensure that the electrolyte can be injected into the housing through the injection hole. On the other hand, when the sealing member is arranged in the injection hole of the top cover plate in a penetrating manner, the blocking piece limits the sealing member, which can prevent such a phenomenon that when the energy storage device vibrates, the electrode assembly pushes the sealing member, loosening the connection between the sealing member and the injection hole, thus ensuring the sealing effect of the sealing member on the injection hole.

As an alternative embodiment, in an embodiment of the first aspect of the present disclosure, the blocking piece is provided with a second through hole communicating to the first through hole; the sealing member is arranged in the injection hole, the first through hole and the second through hole in a penetrating manner in turn along a direction from the second surface to the first surface; one end of the sealing member is located outside the second through hole; the blocking piece has a third side surface facing away from the lower plastic member; the third side surface is provided with a protrusion protruding therefrom; and a height of the protrusion protruding from the third side surface is greater than or equal to a height of one end of the sealing member extending beyond the third side surface. In this way, when the cell vibrates mechanically, the protrusion can be used to stop and limit the electrode assembly to prevent the electrode assembly from pushing the sealing member, resulting in the looseness of or damage to the junction of the sealing member and the injection hole, which is conducive to ensuring the sealing effect of the sealing member on the injection hole.

As an alternative embodiment, in an embodiment of the first aspect of the present disclosure, the third side surface is provided with two protrusions arranged at an interval around an axis of the first through hole, this can avoid, in multiple directions, the electrode assembly from pushing the sealing member when the energy storage device vibrates, thus preventing the looseness in the connection between the sealing member and the liquid injection hole, and more effectively ensuring the sealing effect of the sealing member on the liquid injection hole. Moreover, compared with an annular protrusion surrounding the axis of the second through hole by one circle, the two protrusions arranged on the third side surface can ensure the sealing effect of the sealing member on the liquid injection hole. At the same time, during injection, such a phenomenon is avoided: a liquid seal is formed by the electrolyte on one surface of the protrusion facing away from the blocking piece, making it difficult for the electrolyte to be injected into the housing. Therefore, it can be ensured that the electrolyte can enter the housing during injection.

As an alternative embodiment, in an embodiment of the first aspect of the present disclosure, the protrusion at least blocks part of the second through hole, thus an aperture of the second through hole can be reduced, so that one end of the sealing member can be arranged at the second through hole in a penetrating manner, which is conducive to improving the mounting stability and sealing effect of the sealing member.

As an alternative embodiment, the first through hole is circular; the blocking piece includes a peripheral surface formed by sequentially connecting a first flat surface, a first curved surface, a second flat surface and a second curved surface end to end; the first flat surface is parallel to the second flat surface; a distance between the first flat surface and the second flat surface is less than a diameter of the first through hole; the first curved surface and the second curved surface are respectively located on both sides of the first through hole, so that the blocking piece blocks part of the first through hole. That is, the first pass hole is not completely blocked by the occluder, thus, the electrolyte entering the injection hole can not only enter the housing through the second through hole, but also enter the housing through the part of the first through hole that is not blocked by the blocking piece, which increases the passing flow rate of the electrolyte and increasing the injection speed of the electrolyte.

As an alternative embodiment, in an embodiment of the first aspect of the present disclosure, the first surface is also provided with a first reinforcing rib and a second reinforcing rib protruding therefrom; the first reinforcing rib is connected between the first boss and the third boss, and a height of the first reinforcing rib protruding from the first surface is less than the height of the first boss protruding from the first surface; the second reinforcing rib is connected between the first boss and the fourth boss; and a height of the second reinforcing rib protruding from the first surface is less than the height of the first boss protruding from the first surface.

In this way, the first reinforcing rib and the second reinforcing rib can be used to improve the strength of the lower plastic member, so as to avoid the lower plastic member from bending and deforming towards the electrode assembly and colliding with the battery cell, so as to reduce the damage to the battery cell, which is conducive to prolonging the service life of the energy storage device. Meanwhile, since the height of the first reinforcing rib protruding from the lower plastic member is less than the height of the first boss protruding from the lower plastic member, and the height of the second reinforcing rib protruding from the lower plastic member is less than the height of the first boss protruding from the lower plastic member, when the electrode assembly expands or moves and abuts against the first boss, spaces are still reserved between the first reinforcing rib and the electrode assembly as well as between the second reinforcing rib and the battery cell, and the electrode assembly will not collide with the first reinforcing rib and the second reinforcing rib, which is conducive to reducing the risk of the damage to the electrode assembly and further prolonging the service life of the energy storage device.

As an alternative embodiment, in an embodiment of the first aspect of the present disclosure, a bottom surface of the groove is an inclined plane; the inclined plane has a first boundary line and a second boundary line in an extending direction of the first boss; the second boundary line is close to the first air vent; the inclined plane extends obliquely from the first boundary line to the second boundary line along a first direction; the first direction is configured as a protruding direction of the first boss protruding from the first surface, and the extending direction of the first boss is configured as a direction perpendicular to the first direction.

It can be seen from the foregoing that the groove communicates with the first air vent, when the energy storage device shakes, vibrates, tilts or is placed upside down, the electrolyte in the housing may enter the groove through the first air vent. The bottom surface of the groove is defined as the inclined surface that extends obliquely from the second boundary line to the second boundary line along the first direction, so that the electrolyte in the groove can be guided to the first air vent to flow back into the housing, so as to ensure that the electrode assembly can be immersed in the electrolyte.

As an alternative embodiment, in an embodiment of the first aspect of the present disclosure, the extending direction of the second boss and the extending direction of the first boss form an angle; the extending direction of the first boss is configured as a direction perpendicular to a first direction; and the first direction is configured as a protruding direction of the first boss protruding from the first surface.

By means of defining that the extending direction of the second boss and the extending direction of the first boss form an angle, it is conductive to enabling the second boss and the first boss to have a smaller overlap area and enabling the second boss and the first boss to have a larger stagger area, so as to avoid the second air vent from being blocked by the first boss in a large area. Thus, when the electrode assembly expands or moves to block the first air vent on the first boss, the second air vent on the second boss is still large enough for venting, so as to ensure the pressure relief and explosion protection effect, which is conducive to improving the use safety of the energy storage device.

In the second aspect, the present disclosure discloses a top cover assembly. The top cover assembly includes a top cover plate and the lower plastic member as described in the first aspect. The lower plastic member is connected to the top cover plate, and the first boss and the second boss are located on the side of the lower plastic member facing away from the top cover plate. It can be understood that the top cover assembly with the lower plastic member described in the first aspect also has all the technical effects of the lower plastic member described in the first aspect. That is, the top cover assembly with the lower plastic member described in the first aspect can also solve the problem of the damage to the electrode assembly caused by the following fact: in the transportation process of the battery cell, the lower plastic member will collide with the electrode assembly and break or cut the tab on the electrode assembly due to mechanical vibration. The top cover assembly can prolong the service life of the energy storage device.

As an alternative embodiment, in an embodiment of the second aspect of the present disclosure, a ratio of a thickness of the lower plastic member to a thickness of the top cover plate is D, $0.25 \leq D \leq 0.75$.

It can be seen that in order to realize insulation of the electrode assembly from the housing, an insulation sheet is wrapped at a periphery of the electrode assembly and is in hot-melting connection with a peripheral side surface of the lower plastic member, so as to wrap around the battery cell. In this connection way, the electrode assembly can be suspended through the insulation sheet and the lower plastic member. By means of defining the thickness ratio relationship between the lower plastic member and the top cover plate, on the one hand, it can be ensured that the lower plastic member has sufficient strength and toughness to improve the bearing capacity of the lower plastic member and avoid the problem of breakage of the lower plastic member due to the vibration of the energy storage device during the transportation, which is conducive to prolonging the service life of the lower plastic member. On the other hand, an area of the peripheral side surface of the lower plastic member can be enlarged, so that a large hot-melting connection area can be formed between the lower plastic member and the insulation sheet, thereby achieving stable connection between the insulation sheet and the lower plastic member.

In the third aspect, the present disclosure discloses an energy storage device, wherein the energy storage device includes a housing, an electrode assembly and the top cover assembly as described in the second aspect; the housing is provided with an opening; the electrode assembly is arranged in the housing; the top cover plate is hermetically connected to the opening; and the lower plastic member is arranged toward the battery cell. It can be understood that the top cover assembly has all the beneficial effects of the lower plastic member described in the first aspect, the energy storage device with the top cover assembly described in the second aspect also has all the technical effects of the above lower plastic member. That is, the energy storage device with the top cover assembly described in the second aspect can also solve the problem of the damage to the electrode assembly caused by the following fact: in the transportation process of the battery cell, the lower plastic member will collide with the electrode assembly and break or cut the tab on the electrode assembly due to mechanical vibration. The service life of the energy storage device can be prolonged.

In the fourth aspect of the present disclosure discloses electrical equipment, electrical equipment includes the energy storage device of the third aspect. It can be understood that since the energy storage device has all the beneficial effects of the top cover assembly, the electrical equipment also has all the technical effects of the energy storage device described in the third aspect, that is, the electrical equipment can also solve the problem of the damage to the electrode assembly caused by the following fact: in the transportation process of the battery cell, the lower plastic member will collide with the electrode assembly and break or cut the tab on the electrode assembly due to mechanical vibration. The service life of the electrical equipment can be prolonged.

Compared with the prior art, the present disclosure has the beneficial effects below: An embodiment of the present disclosure provides a lower plastic member, a top cover assembly, an energy storage device and electrical equipment. The first boss is arranged on the first surface a of the lower plastic member, so that when the electrode assembly expands or moves, the first boss can limit electrode assembly to still form a buffer space between the lower plastic member and the battery cell, thus avoiding the damage to the electrode assembly caused by following fact: in the transportation process of the battery cell, the lower plastic member will collide with the electrode assembly and break or cut the tab on the electrode assembly due to mechanical vibration, and achieving an effect of protecting the battery cell, which is conductive to prolonging the service life of the energy storage device. The lower plastic member is also provided with the second boss, and the height of the second boss protruding from the first surface a is defined to be less than that of the first boss protruding from the first surface, so that when the electrode assembly expands or moves to abut against the first boss to block the first air vent, a space can still be reserved between the second boss and the battery cell. The second air vent on the second boss will not be blocked by the battery cell, and the gas in the housing can still be relieved through the second air vent, thus ensuring that the gas in the housing can be discharged to the explosion-proof valve at the explosion-proof hole for pressure relief and explosion proofing to ensure the pressure relief effect of the explosion-proof valve.

In addition, in a sample test, the applicant has found that the explosion-proof valve needs to reach its explosion pressure value before achieving blasting and pressure relief, rather than achieving blasting once the electrode assembly generates gas. Therefore, by means of forming the groove at the position of the second surface corresponding to the first boss, and the groove communicates with the first air vent.

The gas in the housing can be discharged into the groove through the first air vent before the pressure in the housing reaches a blasting pressure value of the explosion-proof valve. On the one hand, the pressure in the housing can be reduced, and the electrode assembly can be avoided from working in a high-pressure environment all the time, which is conducive to enhancing the explosion protection effect and improving the safety of the energy storage device. On the other hand, the impact of gas mixing in electrolyte on the conductivity and service life of the electrode assembly can be avoided, which is conducive to ensuring the use stability and service life of the battery cell.

Further, the groove is arranged at the position of the second surface corresponding to the first boss. Although there is a groove, the position of the lower plastic member that is provided with the groove will not be too thin. It can be seen that the first surface of the lower plastic member is provided with the first boss, and the second surface is provided with the groove at the position corresponding to the first boss, so that the explosion protection effect can be enhanced while ensuring the intensity of the lower plastic member and protecting the battery cell, which is then conductive to improving the use safety of the energy storage device; and the use stability and service life of the electrode assembly can also be guaranteed.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF EMBODIMENTS

Figure 1:
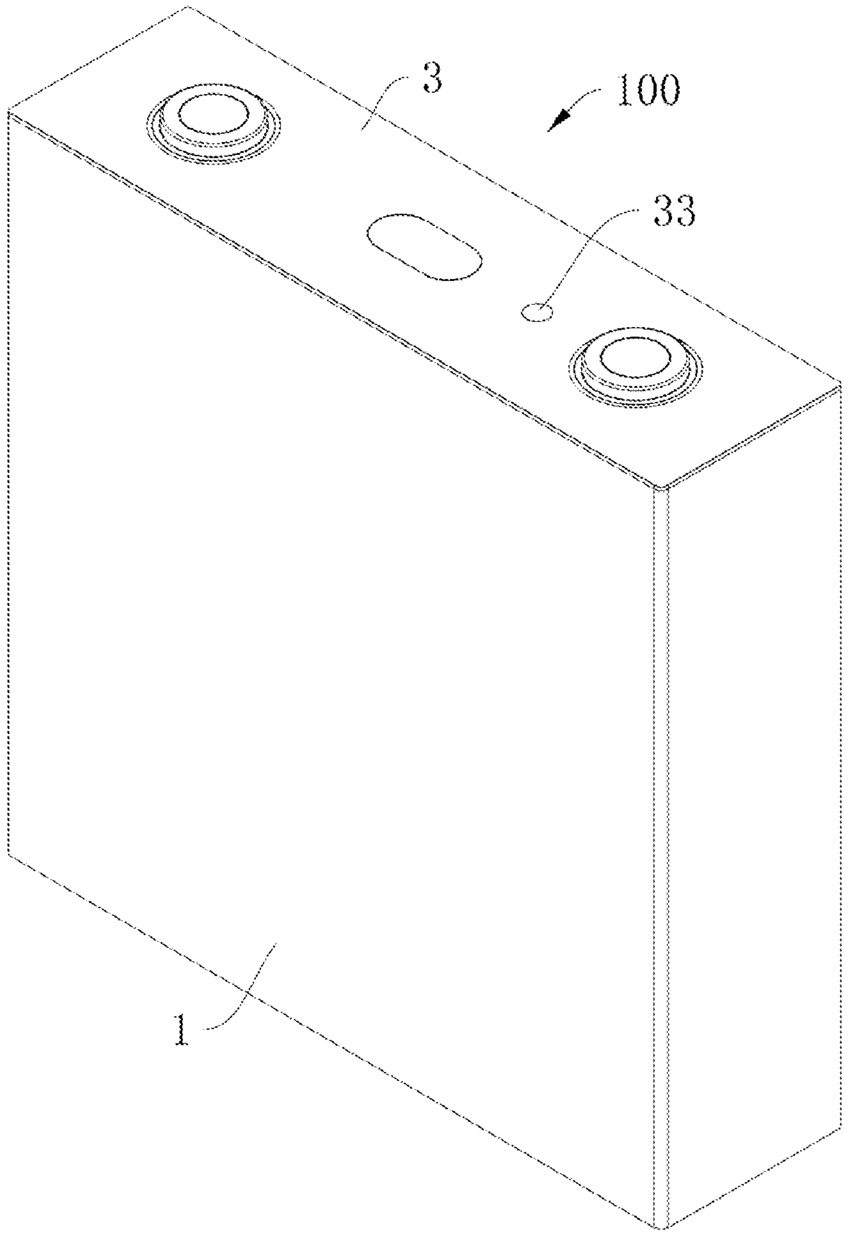
FIG. 1 is a schematic structural diagram of an energy storage device according to an embodiment of the present disclosure.

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments in the present disclosure, all other embodiments obtained by those ordinarily skilled in the art without doing creative work shall fall within the protection scope of the present disclosure.

In the present disclosure, The terms "upper", "lower", "left", "right", "front", "rear", "top", "bottom", "inner", "outer", "middle", "vertical", "horizontal", "transverse", "longitudinal", and the like indicate azimuth or positional relationships based primarily on the azimuth or positional relationships shown in the drawings, Not intended to define the indicated device, element or component must have a particular orientation, or be constructed and operated in a particular orientation.

Furthermore, the above-described partial terms may be used in addition to indicating azimuth or positional relationships, it may also be used to refer to other meanings, such as the term "above" in some cases may also be used to refer to certain dependencies or connectivity. The specific meanings of these terms in the present disclosure will be understood by those of ordinary skill in the art as the case may be.

In addition, the terms "mounted", "disposed", "provided", "connected", "connected", and "socket" are to be construed broadly to mean, for example, a fixed connection, a detachable connection, or an integral construction; It may be a mechanical connection, or an electrical connection; The specific meaning of the above-mentioned terms in the present disclosure will be understood by those of ordinary skill in the art as the case may be, either directly, or indirectly, via an intermediate medium, or internal communication between two devices, elements, or components.

In addition, the terms "first", "second", etc., are used primarily to distinguish different devices, elements or components (the specific type and construction may be the same or different) and are not used to indicate or imply the relative importance or quantity of the indicated device, element or component. Unless otherwise stated, "plurality" means two or more.

The present disclosure is further described below in detail in combination with the accompanying drawings and embodiments.

Referring to FIG. 1 to FIG. 4, the energy storage device 100 provided by the embodiment of the present disclosure includes a housing 1, an electrode assembly 2 and a top cover assembly 3. The housing 1 is provided with an opening 11. The electrode assembly 2 is arranged in the housing 1, and the top cover assembly 3 is hermetically connected to the opening 11 of the housing 1. The top cover assembly 3 includes a top cover plate 31 and a lower plastic member 32 connected to the top cover plate 31. The top cover plate 31 is hermetically connected to the opening of the housing 1 to seal the electrode assembly 2 in the housing 1. At this time, the lower plastic member 32 is arranged towards the electrode assembly 2. In order to ensure the safety of the energy storage device 100, the top cover plate 31 is generally provided with an explosion-proof hole 311; the lower plastic member 32 is provided with an air vent at a position corresponding to the explosion-proof hole; and an explosion-proof valve 312 is covered at the explosion-proof hole 311. When a pressure in the housing 1 reaches a threshold, gas in the housing 1 can be relieved through the explosion-proof valve 312 to reduce the pressure in the housing 1, thus ensuring the safety of the energy storage device 100. However, when the electrode assembly 2 expands or moves during operation, for example, when the electrode assembly 2 expands due to a temperature rise in charging and discharging processes, or when the energy storage device 100 is applied to an automobile, during running of the automobile, the electrode assembly 2 will approach the lower plastic member 32 of the top cover assembly 3 in the process of moving relative the housing 1. As a result, the electrode assembly 2 and other structures arranged on the electrode assembly 2 will collide with the lower plastic member 32, causing damage to the electrode assembly 2, which reduces the service life of the energy storage device 100.

Based on this, a first aspect of the present disclosure provides a lower plastic member to solve the problem of damage to an electrode assembly caused by the fact that a lower plastic member collides with the electrode assembly in the energy storage device and other structures arranged on the battery cell. Specifically referring to FIG. 6 to FIG. 10, the lower plastic member 32 includes a first surface 321*a* and a second surface 321*b* facing away from the first surface 321*a*. The first surface 321*a* faces away from the top cover plate. The second surface 321*b* is formed with a groove

321*c*. The first surface 321*a* is provided with a first boss 322 protruding therefrom. The first boss 322 faces away from the groove 321*c*. The first boss 322 is provided with a first air vent 3221. The first air vent 3221 communicates with the groove 321*c*.

In the lower plastic member 32 provided in the present disclosure, the first boss 322 is arranged on the first surface 321*a* of the lower plastic member 32, so that when the electrode assembly expands or moves, the first boss 322 can limit electrode assembly to still form a buffer space between the lower plastic member 32 and the battery cell, and an electrode assembly (such as a tab) can be located in the buffer space, thus avoiding the damage to the electrode assembly caused by following fact: in the transportation process of the battery cell, the lower plastic member 32 will collide with the electrode assembly and break or cut the tab on the electrode assembly due to vibration, and achieving an effect of protecting the battery cell, which is conductive to prolonging the service life of the energy storage device.

In addition, in a sample test, the applicant has found that the explosion-proof valve 312 usually needs to reach its explosion pressure value before achieving blasting and pressure relief, rather than achieving blasting once the electrode assembly generates gas. Therefore, by means of forming the groove 321*c* at the position of the second surface 321*b* corresponding to the first boss 322, the gas in the housing can be discharged into the groove 321*c* through the first air vent 3221 before the pressure in the housing reaches a blasting pressure value of the explosion-proof valve 312. On the one hand, the pressure in the housing can be reduced, and the electrode assembly can be avoided from working in a high-pressure environment all the time, which is conducive to enhancing the explosion protection effect and improving the safety of the energy storage device. On the other hand, the impact of gas mixing in electrolyte on the conductivity and service life of the electrode assembly can be avoided, which is conducive to ensuring the use stability and service life of the battery cell.

Further, the groove 321*c* is arranged at the position of the second surface 321*b* corresponding to the first boss 322. Although there is a groove 321*c*, the position of the lower plastic member 32 that is provided with the groove 321*c* will not be too thin. It can be seen that the first surface 321*a* of the lower plastic member 32 is provided with the first boss 322, and the second surface 321*b* is provided with the groove 321*c* at the position corresponding to the first boss 322, so that the explosion protection effect can be enhanced while ensuring the intensity of the lower plastic member 32 and protecting the battery cell, which is then conductive to improving the use safety of the energy storage device; and the use stability and service life of the electrode assembly can also be guaranteed.

Figure 6:
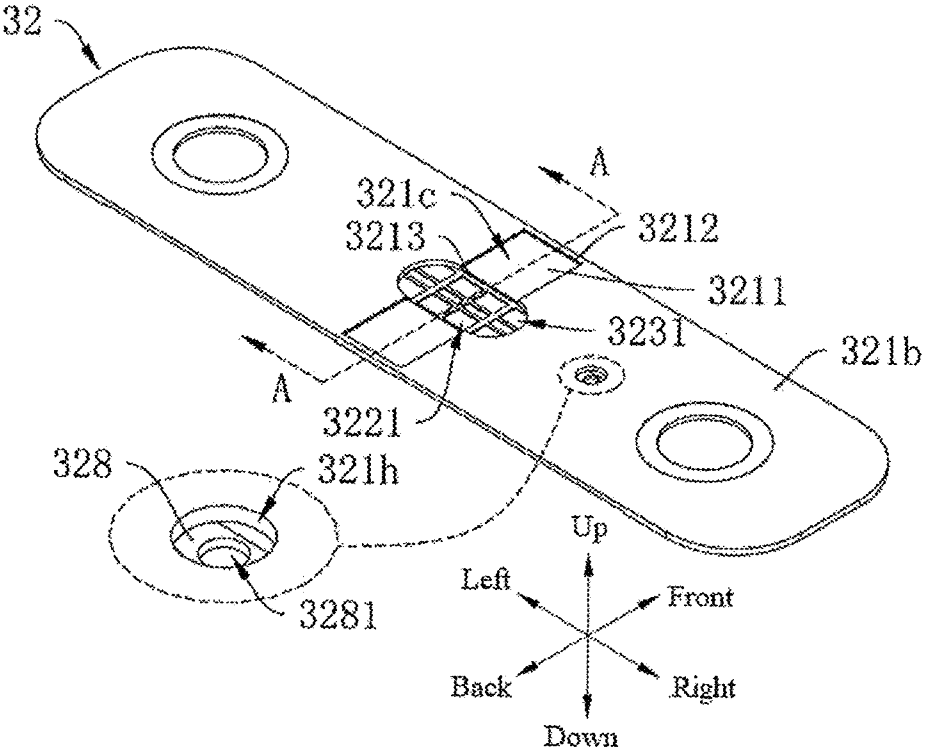
FIG. 6 is a schematic structural diagram of a lower plastic member according to an embodiment of the present disclosure.
Figure 7:
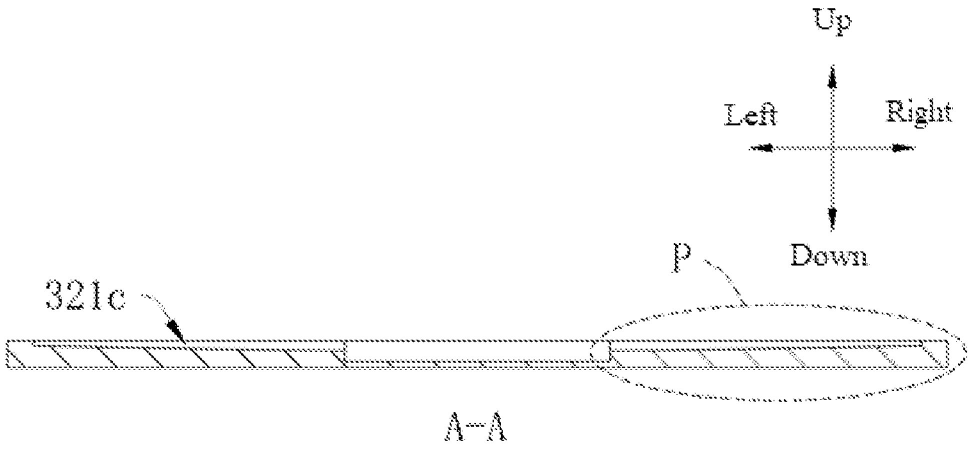
FIG. 7 is a cutaway view of the lower plastic member in FIG. 6 along the A-A direction.
Figure 8:
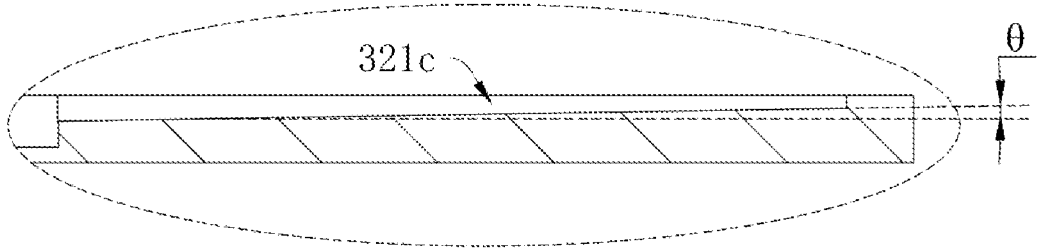
FIG. 8 is a partially enlarged diagram of the part P in FIG. 7.
Figure 9:
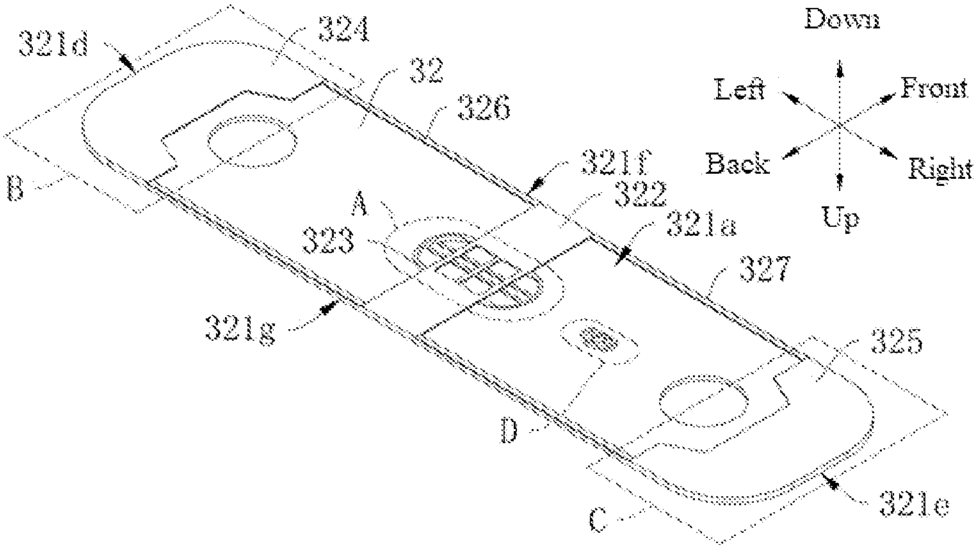
FIG. 9 is a schematic structural diagram of a lower plastic member in another view according to an embodiment of the present disclosure.

For the convenience of description, as shown in FIG. 6, FIG. 7 and FIG. 9, in the present disclosure, a protruding direction of the first boss 322 relative to the first surface 321*a* is configured as a first direction, that is, a thickness direction of the lower plastic member 32 is configured as the first direction, for example, a down direction in FIG. 6, FIG. 7 and FIG. 9, so that the first surface 321*a* and the second surface 321*b* are two opposite side surfaces of the lower plastic member 32 along its thickness direction. In the present disclosure, an extending direction of the first boss 322 is also configured as a direction perpendicular to the first direction, such as a left and right directions or front and back directions in FIG. 6, FIG. 7 and FIG. 9. The above directions are defined only for the convenience of the description of the present disclosure, but should not limit the protection scope of the present disclosure.

In some embodiments, as shown in FIG. 6 to FIG. 9, a bottom surface of the groove 321*c* is an inclined plane 3211. The inclined plane 3211 has a first boundary line 3212 and a second boundary line 3213 in the extending direction of the first boss 322. The second boundary line 3213 is close to the first air vent 3221. The inclined plane 3211 extends obliquely from the first boundary line 3212 to the second boundary line 3213 along the first direction. Since the groove 321*c* communicates with the first air vent 3221, when the energy storage device shakes, vibrates, tilts or is placed upside down, the electrolyte in the housing may enter the groove 321*c* through the first air vent 3221. The bottom surface of the groove 321*c* is defined as the inclined surface 3211 that extends obliquely from the first boundary line 3212 to the second boundary line 3213 along the first direction, so that the electrolyte in the groove 321*c* can be guided to the first air vent 3221 to flow back into the housing, so as to ensure that the electrode assembly can be immersed in the electrolyte.

For example, an inclination angle θ of inclined plane 3211 can satisfy the following relational expression: $0° \leq \theta \leq 10°$, for example, θ=0°, 1°, 2°, 3°, 4°, 5°, 6°, 7°, 8°, 9° or 10°. By means of controlling the inclination angle θ of inclined plane 3211 within the above range, the electrolyte in the groove 321*c* can be better guided to the first air vent 3221 and/or a second air vent 3231 to flow back into the housing, so that the flow guide effect is better.

Figure 10:
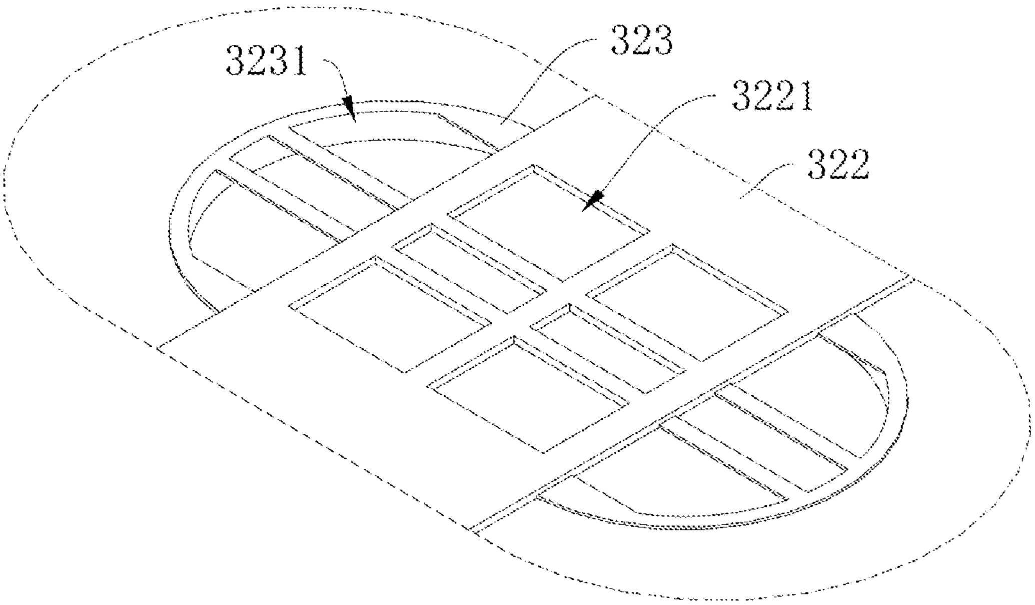
FIG. 10 is a partially enlarged diagram of the part A in FIG. 9.

In some embodiments, as shown in FIG. 6, FIG. 9 and FIG. 10, the first surface 321*a* of the lower plastic member 32 is also provided with a second boss 323 protruding therefrom. Part of the second boss 323 is staggered with the first boss 322, and the second boss 323 is provided with the second air vent 3231 communicating with the groove 321*c*. A height of the second boss 323 protruding from the first surface 321*a* is less than that of the first boss 322 protruding from the second surface 321*b*, so that when the electrode assembly blocks the first air vent 3221, the gas in the housing can be relieved through the second air vent 3231 to reduce the pressure in the housing, so as to improve the safety of the energy storage device. In the present disclosure, the first surface 321*a* of the lower plastic member 32 is also provided with the second boss 323, and the height of the second boss 323 protruding from the first surface 321*a* is defined to be less than that of the first boss 322 protruding from the first surface 321*a*, so that when the electrode assembly expands or moves to abut against the first boss 322 to block the first air vent 3221, a space can still be reserved between the second boss 323 and the battery cell. The second air vent 3231 on the second boss 323 will not be blocked by the battery cell, and the gas in the housing can still be relieved through the second air vent 3231, thus ensuring that the gas in the housing can be discharged to the explosion-proof valve 312 at the explosion-proof hole 311 for pressure relief and explosion proofing to ensure the pressure relief effect of the explosion-proof valve 312.

In some embodiments, a projection of the second boss 323 on the lower plastic member 32 and a projection of the explosion-proof valve 312 on the lower plastic member 32 can substantially overlap, that is, a projection area of the second boss 323 on the lower plastic member 32 is substantially equal to a projection area of the explosion-proof valve 312 on the lower plastic member 32. This way can ensure that the second air vent 3231 on the second boss 323 corresponds to the explosion-proof valve 312, so that the gas in the housing can be discharged to the explosion-proof valve 312 through the second air vent 3231 for pressure relief, thus enhancing the explosion protection effect of the explosion-proof valve 312. It can be known that if the projection area of the second boss 323 on the lower plastic member 32 is larger than the projection area of the explosion-proof valve 312 on the lower plastic member 32, it is usually difficult for the second air vent 3231 of the second boss 323 staggered with the explosion-proof valve 312 to discharge the gas in the housing to the explosion-proof valve 312. Therefore, by means of controlling the projection area of the second boss 323 on the lower plastic member 32 to be within a range greater than the projection area of the explosion-proof valve 312 on the lower plastic member 32, it is difficult to effectively enhance the explosion protection effect of the explosion-proof valve 312, and the weight of the second boss 323 will increase, making it difficult to design a lightweight lower plastic member 32. In the present disclosure, by means of defining that the projection area of the second boss 323 on the lower plastic member 32 is substantially equal to the projection area of the explosion-proof valve 312 on the lower plastic member 32, the weight of the lower plastic member 32 can be reduced while ensuring the pressure relief and explosion protection effect of the explosion-proof valve 312, so that the lower plastic member 32 can satisfy a lightweight design.

In some embodiments, the extending direction of the second boss 323 and the extending direction of the first boss 322 form an angle. For example, an included angle between the extending direction of the second boss 323 and the extending direction of the first boss 322 can be 30°, 45°, 60°, 75°, 80°, 85°, 88°, 90°, or the like. By means of defining that the extending direction of the second boss 323 is perpendicular to the extending direction of the first boss 322, it is conductive to enabling the second boss 323 and the first boss 322 to have a smaller overlap area and enabling the second boss 323 and the first boss 322 to have a larger stagger area, so as to avoid the second air vent 3231 from being blocked by the first boss 322 in a large area. Thus, when the electrode assembly expands or moves to block the first air vent 3221 on the first boss 322, the second air vent 3231 on the second boss 323 is still large enough for venting, so as to ensure the pressure relief and explosion protection effect, which is conducive to improving the use safety of the energy storage device.

Preferably, the extending direction of the second boss 323 is perpendicular to the extending direction of the first boss 322, that is, the included angle between the extending direction of the second boss 323 and the extending direction of the first boss 322 is 90°, which is conducive to enabling the second boss 323 and the first boss 322 have a smaller overlap area and enabling the second boss 323 and the first boss 322 to have a larger stagger area. Thus, when the electrode assembly expands or moves to block the first air vent 3221 on the first boss 322, the second air vent 3231 on the second boss 323 can have a better venting effect and a better pressure relief and explosion protection effect, which is conducive to further improving the use safety of the energy storage device.

In some embodiments, the first air vent 3221 penetrates through a surface of the first boss 322 facing away from the lower plastic member 32, and a proportion of an air permeability area of the first air vent 3221 to an area of the surface of the first boss 322 is greater than or equal to 18% and less than or equal to 20%, that is, a ratio of the projection area of the first air vent 3221 on the lower plastic member 32 to the projection area of the first boss 322 on the lower plastic member 32 is greater than or equal to 15% and less than or equal to 25%, for example, 15%, 15.5%, 16% 16.5%, 17%, 17.5%, 18%, 18.2%, 18.5%, 18.8%, 19%, 19.1%, 19.3%, 19.5%, 19.8%, 20%, 20.5%, 21%, 21.5%, 22%, 22.5%, 23%, 23.5%, 24%, 24.5% or 25%; and/or, the second air vent 3231 penetrates through a surface of the second boss 323 facing away from the lower plastic member 32; a ratio of an air permeability area of the second air vent 3231 on the surface of the second boss 323 to the air permeability area of the first air vent 3221 on the surface of the first boss 322 is 0.88 to 1.22; a ratio of the projection area of the second air vent 3231 on the lower plastic member 32 to the projection air vent of the first air vent 3221 on the lower plastic member 32 is 0.98 to 1.02, for example, 0.88, 0.9, 0.92, 0.95, 0.98, 0.985, 0.99, 0.995, 1.10, 1.05, 1.11, 1.115, 1.02, 1.2, 1.22 or the like.

By means of controlling the proportion of the air permeability area of the first air vent 3221 on the surface with the first boss 322 to be within the above range, it can be ensured that an overall width of the first air vent 3221 is greater than a width of the explosion-proof valve in a width direction of the lower plastic member 32. By means of controlling the ratio of the air permeability area of the second air vent 3231 on the surface with the second boss 323 to the air permeability area of the first air vent 3221 on the surface with the first boss 322 to be within the above range, it can be ensured that a sum of an overall length of the first air vent 3221 and an overall length of the second air vent 3231 is greater than a length of the explosion-proof valve in a lengthwise direction of the lower plastic member 32, so as to ensure that the explosion-proof valve can select an appropriate effective explosion-proof area, improve the explosion prevention effect of the explosion-proof valve, and ensure the strength of a region of the lower plastic member 32 corresponding to the explosion-proof valve.

In some embodiments, referring to FIG. 6 and FIG. 9, the shape of the lower plastic member 32 can be roughly rectangular. That is, within an allowable machining error range, the shape of the lower plastic member 32 is rectangular or approximately rectangular. The lower plastic member 32 includes a first edge 321*d* and a second edge 321*e*. The first edge 321*d* and the second edge 321*e* are respectively located at both ends of the lower plastic member 32 along the lengthwise direction of the lower plastic member. The first surface 321*a* is also provided with a third boss 324 and a fourth boss 325 protruding therefrom. The third boss 324 is arranged on the first surface 321*a* of the lower plastic member 32 and extends along the first edge 321*d*. The fourth boss 325 is arranged on the first surface 321*a* of the lower plastic member 32 and extends along the second edge 321*e*. The first boss 322 is located between the third boss 324 and the fourth boss 325. Thus, when the electrode assembly expands or moves, the first boss 322, the third boss 324 and the fourth boss 325 all can stop and limit the battery cell. In this way, the electrode assembly can be stopped and limited by the middle portion and two opposite edges of the lower plastic member 32, making the stop and limit effect better, thus avoiding the damage to the electrode assembly caused by following fact: in the transportation process of the battery cell, the lower plastic member 32 will collide with the electrode assembly and break or cut the tab on the electrode assembly due to mechanical vibration, and achieving a better protection effect, which is conductive to further prolonging the service life of the energy storage device.

Further, it can be understood that when the third boss 324 and the fourth boss 325 are arranged on the lower plastic member 32, the third boss 324 and the fourth boss 325 can play a role in improving the strength of the lower plastic member 32. Based on this, the third boss 324 extends along the first edge 321*d* of the lower plastic member 32, the fourth boss 325 extends along the second edge 321*e* of the lower plastic member 32, and the first edge 321*d* and the second edge 321*e* are two opposite edges of the rectangular lower plastic member 32, so that the third boss 324 and the fourth boss 325 can improve the strength of the lower plastic member 32 on the two opposite edges of the lower plastic member 32, and the improvement effect is better.

In some embodiments, the first edge 321*d* and the second edge 321*e* are arranged on two edges of the lower plastic member 32 along the lengthwise direction, for example, the first edge 321*d* and the second edge 321*e* are arranged on two edges of the lower plastic member 32 in the left and right directions in FIG. 9. The length of the first boss 322, the length of the third boss 324 and the length of the fourth boss 325 are all equal to the width of the lower plastic member 32. By means of making the length of the first boss 322, the length of the third boss 324 and the length of the fourth boss 325 all equal to the width of the lower plastic member 32, the two ends of the first boss 322 and the two ends of the lower plastic member 32 in the width direction can be made to be flush with each other; the two ends of the third boss 324 and the two ends of the lower plastic member 32 in the width direction can be made to be flush with each other; and the two ends of the fourth boss 325 and the two ends of the lower plastic member 32 in the width direction can be made to be flush with each other. In this way, a better improvement effect can be achieved on the strength of the lower plastic member 32, and a better stop and limit effect can be achieved on the battery cell. Two end faces of the first boss 322, two end faces of the third boss 324 and two end faces of the fourth boss 325 provide hot melting connection positions for an insulation sheet for wrapping the battery cell, so that the insulation sheet and the lower plastic member 32 can be in hot-melting connection through a plurality of hot-melting connection positions to achieve stable connection between the insulation sheet and the lower plastic member 32. Thus, the insulation sheet can be connected to the lower plastic member 32 to enclose the battery cell, so as to achieve overall protection of the electrode assembly and guarantee the insulation of the electrode assembly from the housing.

In some embodiments, the first surface 321*a* of the lower plastic member 32 is also provided with a first reinforcing rib 326 and a second reinforcing rib 327 protruding therefrom. The first reinforcing rib 326 is connected between the first boss 322 and the third boss 324, and a height of the first reinforcing rib 326 protruding from the first surface 321*a* is less than the height of the first boss 322 protruding from the first surface 321*a*. The second reinforcing rib 327 is connected between the first boss 322 and the fourth boss 325, and a height of the second reinforcing rib 327 protruding from the first surface 321*a* is less than the height of the first boss 322 protruding from the first surface 321*a*. In this way, the first reinforcing rib 326 and the second reinforcing rib 327 can be used to improve the strength of the lower plastic member 32, so as to avoid the lower plastic member 32 from bending and deforming towards the electrode assembly and colliding with the battery cell, so as to reduce the damage to the battery cell, which is conducive to prolonging the service life of the energy storage device. Meanwhile, since the height of the first reinforcing rib 326 protruding from the first surface 321*a* is less than the height of the first boss 322 protruding from the first surface 321*a*, and the height of the second reinforcing rib 327 protruding from the first surface 321*a* is less than the height of the first boss 322 protruding from the first surface 321*a*, when the electrode assembly expands or moves and abuts against the first boss 322, spaces are still reserved between the first reinforcing rib 326 and the electrode assembly as well as between the second reinforcing rib 327 and the battery cell, and the electrode assembly will not collide with the first reinforcing rib 326 and the second reinforcing rib 327, which is conducive to reducing the risk of the damage to the electrode assembly and further prolonging the service life of the energy storage device.

For example, as shown in FIG. 9, the lower plastic member 32 also has a third edge 321*f* and a fourth edge 321*g* which are opposite to each other. The third edge 321*f* and the fourth edge 321*g* are respectively located on both sides of the lower plastic member 32 along the width direction of the lower plastic member. There are two first reinforcing ribs 326 and two second reinforcing ribs 327. One first reinforcing rib 326 is arranged between the first boss 322 and the third boss 324 along the third edge 321*f* of the lower plastic member 32. The other first reinforcing rib 326 is arranged between the first boss 322 and the third boss 324 along the fourth edge 321*g* of the lower plastic member 32. One second reinforcing rib 327 is arranged between the first boss 322 and the fourth boss 325 along the third edge 321*f* of the lower plastic member 32. The other second reinforcing rib 327 is arranged between the first boss 322 and the fourth boss 325 along the fourth edge 321*g* of the lower plastic member 32. Based on this, one first reinforcing rib 326 is arranged along the third edge 321*f* of the lower plastic member 32; one second reinforcing rib 327 is arranged along the third edge 321*f* of the lower plastic member 32; the other first reinforcing rib 326 is arranged along the fourth edge 321*g* of the lower plastic member 32; the other second reinforcing rib 327 is arranged along the fourth edge 321*g* of the lower plastic member 32; and the third edge 321*f* and the fourth edge 321*g* are the other two opposite edges of the rectangular lower plastic member 32. Therefore, the two first reinforcing ribs 326 and the two second reinforcing ribs 327 can improve the strength of the lower plastic member 32 on the other two opposite edges of the lower plastic member 32, and the improvement effect is better. To sum up, in the present disclosure, the third boss 324 and the fourth boss 325 can be used to improve the strength of the lower plastic member 32 on the two opposite edges of the lower plastic member 32, and the two first reinforcing ribs 326 and the two second reinforcing ribs 327 can be used to improve the strength of the lower plastic member 32 on the other two opposite edges of the lower plastic member 32, so that the improvement effect is better.

Figure 11:
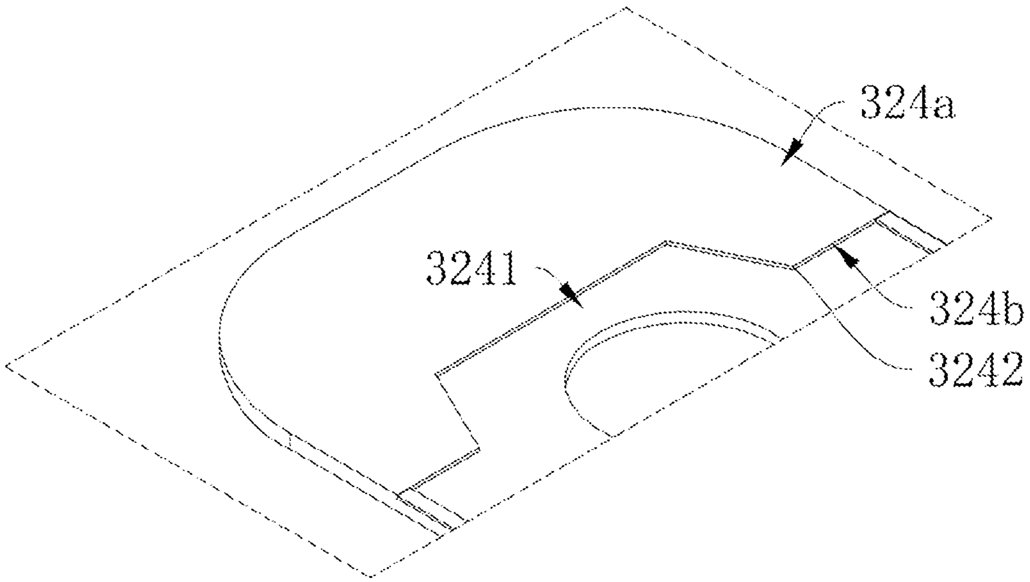
FIG. 11 is a partially enlarged diagram of the part B in FIG. 9.
Figure 12:
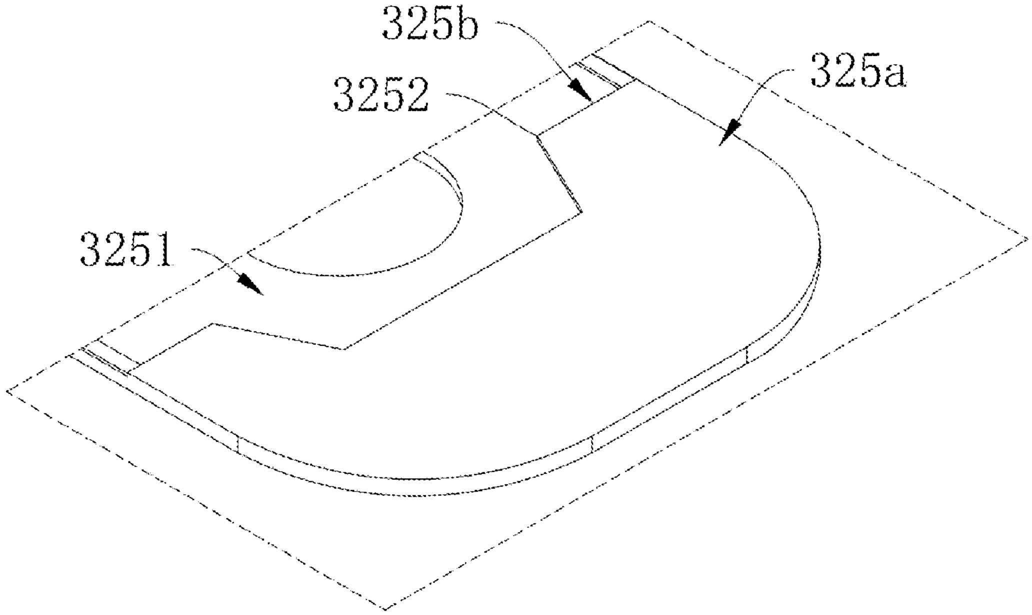
FIG. 12 is a partially enlarged diagram of the part C in FIG. 9.

In some embodiments, as shown in FIG. 9, FIG. 11 and FIG. 12, the third boss 324 has a first surface 324*a* arranged far from the first surface 321*a*, and a second surface 324*b* connected with an edge of the first surface 324*a*. The second surface 324*b* is arranged toward the first boss. The first surface 324*a* is provided with a first slot 3241 penetrating through the second surface 324*b*, and a first chamfer 3242 is arranged at a junction of a wall surface of the first slot 3241 and the second surface 324*b*. The fourth boss 325 has a third surface 325*a* arranged far from the first surface 321*a*, and a fourth surface 325*b* connected with an edge of the third surface 325*a*. The fourth surface 325*b* is arranged toward the first boss. The third surface 325*a* is provided with a second slot 3251 penetrating through the fourth surface 325*b*, and a second chamfer 3252 is arranged at a junction of a wall surface of the second slot 3251 and the fourth surface 325*b*. One avoiding slot from the first slot 3241 and the second slot

3251 can be used for avoiding a positive adapter plate, and the other avoiding slot from the first slot 3241 and the second slot 3251 can be used for avoiding a negative adapter plate. The first chamfer 3242 and the second chamfer 3252 can be fillets or bevel chamfers.

It can be seen from the foregoing that when the electrode assembly expands or moves, the electrode assembly will be stopped and limited by the third boss 324 and the fourth boss 325, or during assembling, the electrode assembly may abut against the third boss 324 and the fourth boss 325. By means of arranging the first chamfer 3242 at the junction of the wall surface of the first slot 3241 and the second surface 324*b*, and arranging the second chamfer 3252 at the junction of the wall surface of the second slot 3251 and the fourth surface 325*b*, sharp corners can be formed at the junction of the wall surface of the first slot 3241 and the second surface 324*b* as well as at the junction of the wall surface of the second slot 3251 and the fourth surface 325*b*, and will cut the tab of the battery cell. Therefore, the first chamfer 3242 and the second chamfer 3252 can play a role of protecting the tab.

For example, an obtuse angle can be formed between the wall surface of the first slot 3241 and the second surface 324*b*, so that the first chamfer 3242 is arranged at the junction of the wall surface of the first slot 3241 and the second surface 324*b*. Similarly, an obtuse angle can be formed between the wall surface of the second slot 3251 and the fourth surface 325*b*, so that the second chamfer 3252 is arranged at the junction of the wall surface of the second slot 3251 and the fourth surface 325*b*. It can be understood that in other embodiments, a right angle or an acute angle can be formed between the wall surface of the first slot 3241 and the second surface 324*b*. In this case, the junction of the wall surface of the first slot 3241 and the second surface 324*b* can be chamfered to form the first chamfer 3242. Similarly, a right angle or an acute angle can be formed between the wall surface of the second slot 3251 and the fourth surface 325*b*. In this case, the junction of the wall surface of the second slot 3251 and the fourth surface 325*b* can be chamfered to form the second chamfer 3252.

In some embodiments, in combination with FIG. 4, FIG. 5, FIG. 9, FIG. 10 and FIG. 13, the top cover assembly 3 also includes a sealing member 33, such as a silicone nail, a rubber nail, a plastic nail, a foam nail or other sealing nails. The top cover plate 31 is also provided with an injection hole 313 penetrating therethrough. The sealing member 33 seals the injection hole 313. After the injection is completed, the injection hole 313 is sealed, so as to seal the electrode assembly in the housing. The lower plastic member 32 can also include a blocking piece 328. The lower plastic member 32 is provided with a first through hole 321*h* corresponding to the injection hole 313. The first through hole 321*h* penetrates through the first surface 321*a* and the second surface 321*b*. The blocking piece 328 is covered at the first through hole 321*h* of the lower plastic member 32, and the blocking piece 328 is connected to the first surface 321*a*. That is, the blocking piece 328 is located on a side of the lower plastic member 32 far from the top cover plate 31, and the first boss 322, the second boss 323, the third boss 324, the fourth boss 325, the first reinforcing rib 326 and the second reinforcing rib 327 are all located on one side of the lower plastic member 32 facing away from the top cover plate 31. The blocking piece 328 is arranged to block the injection hole 313. On the one hand, when electrolyte is injected into the housing, the tab of the electrode assembly can be prevented from entering the injection hole 313 to block the injection hole 313, so as to ensure that the electrolyte can be injected into the housing through the injection hole 313. On the other hand, when the sealing member 33 is arranged in the injection hole 313 of the top cover plate 31 in a penetrating manner, the blocking piece 328 limits the sealing member, which can prevent such a phenomenon that when the energy storage device vibrates, the electrode assembly pushes the sealing member 33, loosening the connection between the sealing member 33 and the injection hole 313, thus ensuring the sealing effect of the sealing member 33 on the injection hole 313.

Optionally, the first boss 322, the second boss 323, the third boss 324, the fourth boss 325, the first reinforcing rib 326 and the second reinforcing rib 327 can be integrally molded on the side of the lower plastic member 32 facing away from the top cover plate 31. Of course, in other embodiments, the first boss 322, the second boss 323, the third boss 324, the fourth boss 325, the first reinforcing rib 326 and the second reinforcing rib 327 can also be separately arranged on the side of the lower plastic member 32 facing away from the top cover plate 31. That is, machining methods of the first boss 322, the second boss 323, the third boss 324, the fourth boss 325, the first reinforcing rib 326 and the second reinforcing rib 327 can be selected according to actual needs, and are not limited in the embodiments of the present disclosure.

In some embodiments, the blocking piece 328 is provided with a second through hole 3281 communicating with the first through hole 321*h*, so that during liquid injection, the electrolyte can enter the housing through the injection hole 313, the first through hole 321*h* and the second through hole 3281 in turn to immerse the battery cell. The sealing member 33 is arranged in the injection hole 313, the first through hole 321*h* and the second through hole 3281 in a penetrating manner in turn along a direction towards an electrode assembly, and one end of the sealing member 33 is located outside the second through hole 3281, which can not only play a sealing role, but also improve the connection stability of the sealing member 33 in the injection hole 313. The blocking piece 328 has a third side surface 3280 facing away from the lower plastic member 32. The third side surface 3280 is provided with a protrusion 3282 protruding therefrom. A height of the protrusion 3282 protruding from the third side surface 3280 is greater than or equal to a height of one end of the sealing member 33 extending beyond from the third side surface 3280. In this way, when the energy storage device vibrates mechanically, the protrusion 3282 can be used to stop and limit the electrode assembly to prevent the electrode assembly from pushing the sealing member 33, resulting in the looseness of or damage to the junction of the sealing member 33 and the injection hole 313, which is conducive to ensuring the sealing effect of the sealing member 33 on the injection hole 313.

Figure 13:
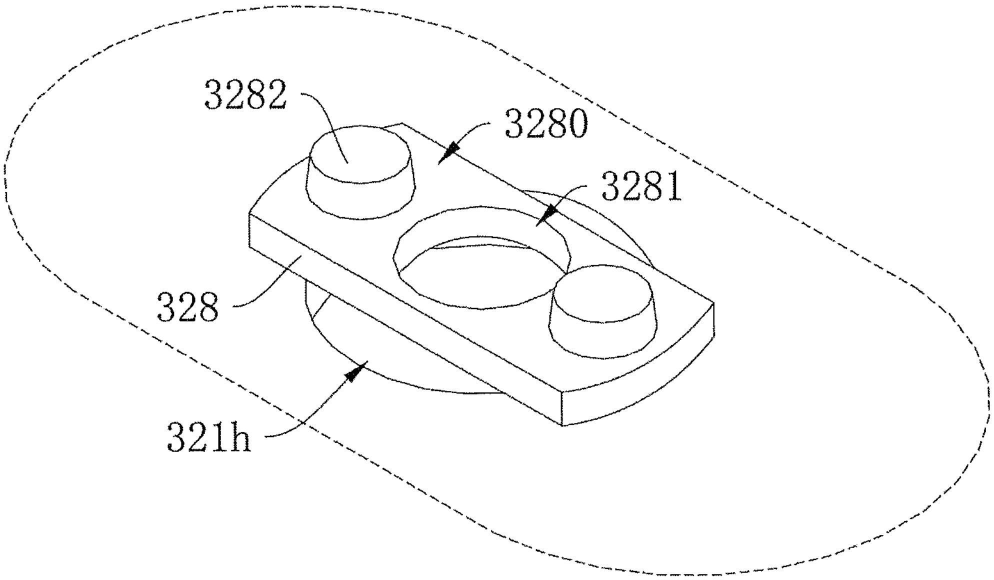
FIG. 13 is a partially enlarged diagram of the part D in FIG. 9.
Figure 14:
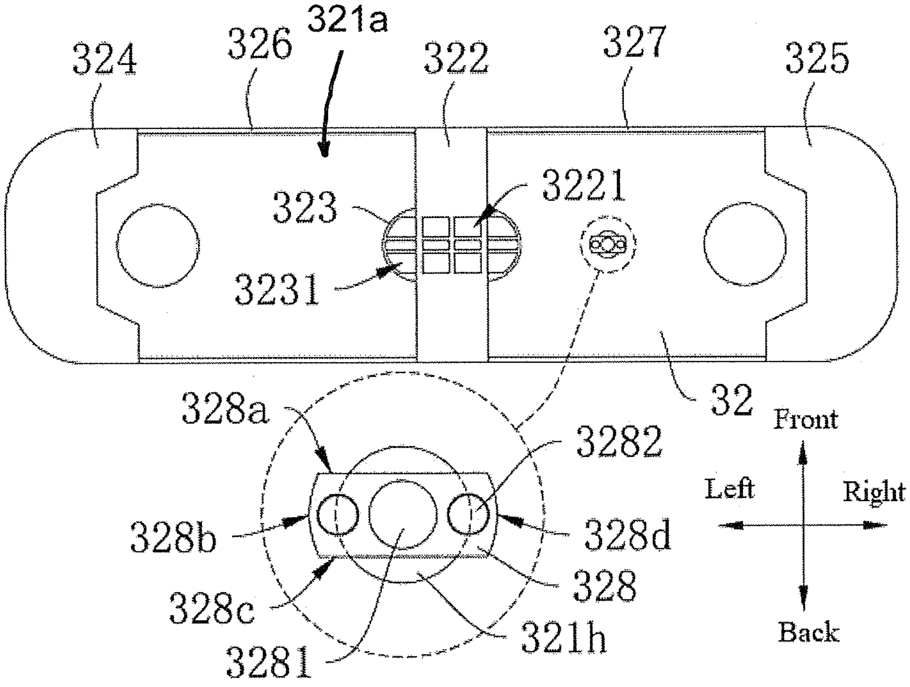
FIG. 14 is a top view of the lower plastic member in FIG. 9.

In some embodiments, in combination with FIG. 9. FIG. 13 and FIG. 14, the blocking piece 328 blocks part of the first through hole 321*h*, that is, a cross-sectional area of the first through hole 321*h* cut by a plane perpendicular to an axis of the first through hole 321*h* is larger than an overlap area between the blocking piece 328 and the first through hole 321*h*, which indicates that the first through hole 321*h* will not be completely blocked by the blocking piece 328. Thus, the electrolyte entering the injection hole 313 can not only enter the housing through the second through hole 3281, but also enter the housing through the part of the first through hole 321*h* that is not blocked by the blocking piece 328. Therefore, the blocking piece 328 is arranged to block part of the first through hole 321*h*, rather than the entire first through hole 321*h*, so that the junction of the sealing member 33 and the injection hole 313 can be avoided from being loosened. The sealing effect of the sealing member 33 on the injection hole 313 is ensured; the passing flow rate of the electrolyte is increased; and the injection speed of the electrolyte is increased.

For example, in combination with FIG. 9, FIG. 13 and FIG. 14, the first through hole 321*h* is circular. The blocking piece 328 includes a peripheral surface formed by sequentially connecting a first flat surface 328*a*, a first curved surface 328*b*, a second flat surface 328*c* and a second curved surface 328*d* end to end. The first flat surface 328*a* is parallel to the second flat surface 328*c*, and a distance between the first flat surface 328*a* and the second flat surface 328*c* is less than a diameter of the first through hole. The first curved surface 328*b* and the second curved surface 328*d* are respectively located on both sides of the first through hole 321*h*, so that the blocking piece 328 blocks one part of the first through hole 321*h*. Thus, the electrolyte entering the injection hole 313 can not only enter the housing through the second through hole 3281, but also enter the housing through the part of the first through hole 321*h* that is not blocked by the blocking piece 328, which increases the passing flow rate of the electrolyte and increasing the injection speed of the electrolyte.

It can be understood that in other embodiments, the blocking piece 328 can also include a peripheral surface formed by sequentially connecting a first flat surface, a first curved surface, a second flat surface, a third flat surface and a fourth flat surface end to end. The first flat surface is parallel to a second flat surface, and a distance between the first flat surface and the second flat surface is less than a diameter of the first through hole. The first curved surface is located on one side of the first through hole 321*h*. The third flat surface and the fourth flat surface are arranged at an angle. The third flat face and the fourth flat face are both located on the other side of the first through hole 321*h*, so that the blocking piece 328 can block one part of the first through hole 321*h*.

In the present disclosure, the following solution is preferred: The blocking piece 328 includes the peripheral surface formed by sequentially connecting the first flat surface 328*a*, the first curved surface 328*b*, the second flat surface 328*c* and the second curved surface 328*d* end to end. The first flat surface 328*a* is parallel to the second flat surface, and the first curved surface 328*b* is parallel to the second curved surface 328*d*.

In the implementation shown in FIG. 14, the blocking piece 328 has a first opposite side and a second opposite side in its width direction, and a first opposite end and a second opposite end in its lengthwise direction. For example, the blocking piece 328 has a first opposite side and a second opposite side in the up and down directions in FIG. 14, and a first opposite end and a second opposite end in the left and right directions in FIG. 14. The first opposite end and the second opposite end are located on both sides of the first through hole 321*h* and are respectively connected with the lower plastic member 32. A side surface of the first opposite side is the first flat surface 328*a* described above; a side surface of the second opposite side is the second flat surface 328*c* described above; an end face of the first opposite end is the first curved surface 328*b* described above; and an end face of the second opposite end is the second curved surface 328*d* described above. The first through hole 321*h* is provided with a first portion, a second portion and a third portion. The first portion is blocked by the blocking piece 328. The second portion and the third portion are located on two opposite sides of the first portion. The second portion is located on the first opposite side of the blocking piece 328 and is not blocked by the blocking piece 328. The third portion is located on the second opposite side of the blocking piece 328 and is not blocked by the blocking piece 328. Thus, the electrolyte entering the injection hole 313 can not only enter the housing through the second through hole 3281, but also enter the housing through the second portion and the third portion, which increases the passing flow rate of the electrolyte and increasing the injection speed of the electrolyte.

It can be seen that if a projection of the end face of the first opposite end on the lower plastic member 32 is a first straight line, and a connection portion of the first opposite end to the lower plastic member 32 is in the projection on the lower plastic member 32, a boundary line opposite the first straight line is an arc line, so that a contact area between the first opposite end and the lower plastic member 32 is irregular, which is likely to lead to non-uniform stress on the connection portion of the first opposite end to the lower plastic member 32. As a result, the connection between the blocking piece 328 and the lower plastic member 32 is unstable. Similarly, if a projection of the end face of the second opposite end on the lower plastic member 32 is a second straight line, and a connection portion of the second opposite end to the lower plastic member 32 is in the projection on the lower plastic member 32, a boundary line opposite the second straight line is an arc line, so that a contact area between the second opposite end and the lower plastic member 32 is irregular, which is likely to lead to non-uniform stress on the connection portion of the second opposite end to the lower plastic member 32. As a result, the connection between the blocking piece 328 and the lower plastic member 32 is unstable. In the present disclosure, the end face of the first opposite end is defined as a curved surface having a consistent curvature with that of a wall surface of the first through hole 321*h*, and the end face of the second opposite end is defined as a curved surface having a consistent curvature with that of a wall surface of the first through hole 321*h*, so that the contact area between the first opposite end and the lower plastic member 32 is regular, and the contact area between the second opposite end and the lower plastic member 32 is regular. Thus, the stress on the connection portion of the first opposite end to the lower plastic member 32 is uniform, and the stress on the connection portion of the second opposite end to the lower plastic member 32 is uniform, which improves the connection stability between the blocking piece 328 and the lower plastic member 32.

In some embodiments, the protrusion 3282 can be located at a periphery of the second through hole 3281. The protrusion 3282 at this time will not block the second through hole 3281, or the protrusion 3282 can cover at least part of the second through hole 3281. When the protrusion 3282 at least blocks part of the second through hole 3281, an aperture of the second through hole 3281 can be reduced, so that one end of the sealing member 33 can be arranged at the second through hole 3281 in a penetrating manner, which is conducive to improving the mounting stability and sealing effect of the sealing member 33. The protrusion 3282 can at least block part of the second through hole 3281, which can be understood below: The protrusion 3282 can block one part of the second through hole 3281. In this case, during injection, the electrolyte can enter the housing through the second through hole 3281. Alternatively, the protrusion 3282 can completely block the second through hole 3281. In this case, the blocking piece 328 needs to be staggered with the first through hole 321*h*, so that during injection, the electrolyte can enter the housing through the part of the first through hole 321*h* that is not blocked by the blocking piece 328.

In some embodiments, the third side surface 3280 can be provided with two protrusions 3282. The two protrusions 3282 are arranged at an interval around the axis of the second through hole 3281. This can avoid, in multiple directions, the electrode assembly from pushing the sealing member 33 when the energy storage device vibrates, thus preventing the looseness in the connection between the sealing member 33 and the liquid injection hole 313, and more effectively ensuring the sealing effect of the sealing member 33 on the liquid injection hole 313. Moreover, compared with an annular protrusion 3282 surrounding the axis of the second through hole 3281 by one circle, the two protrusions 3282 arranged on the third side surface 3280 can ensure the sealing effect of the sealing member 33 on the liquid injection hole 313. At the same time, during injection, such a phenomenon is avoided: a liquid seal is formed by the electrolyte on one surface of the protrusion 3282 facing away from the blocking piece 328, making it difficult for the electrolyte to be injected into the housing. Therefore, it can be ensured that the electrolyte can enter the housing during injection.

The two protrusions 3282 are arranged at an interval around the axis of the second through hole 3281, which can be understood below: The two protrusions 3282 are arranged at an interval around the axis of the second through hole 3281 and at a periphery of the second through hole. That is, the protrusions 3282 will not block the second through hole 3281, or only one of the two protrusions 3282 at least blocks the second through hole 3281, or part of the two protrusions 3282 at least blocks the second through hole 3281.

Figure 3:
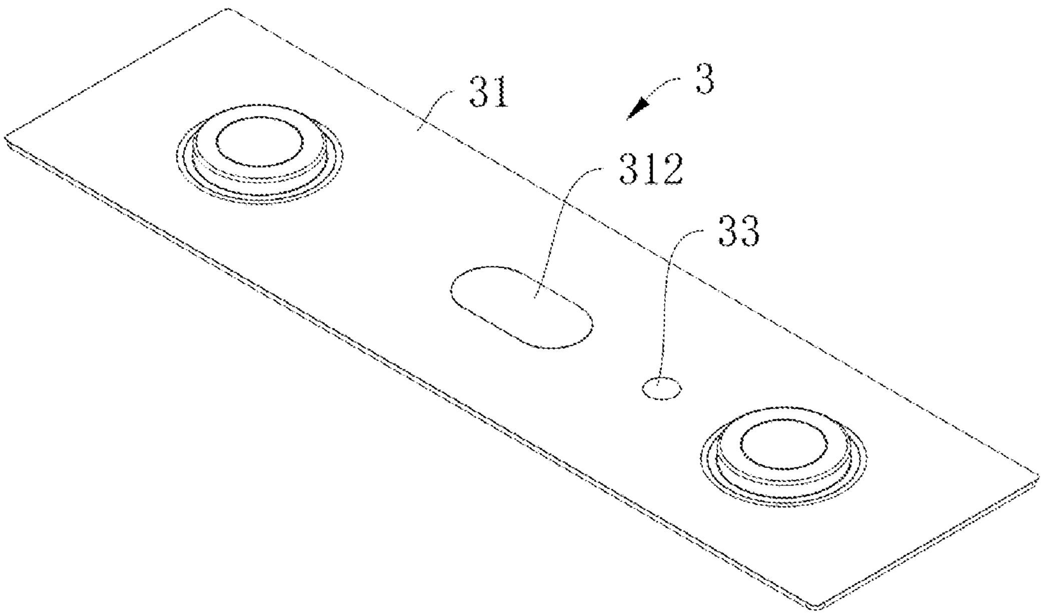
FIG. 3 is a schematic structural diagram of a top cover assembly according to an embodiment of the present disclosure.
Figure 4:
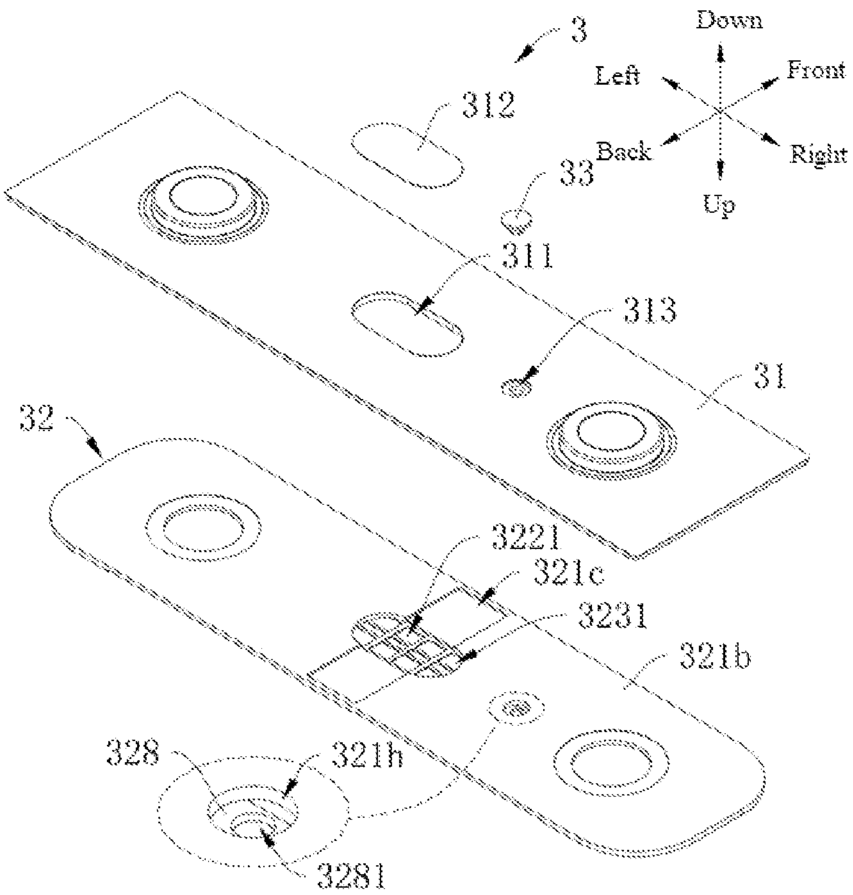
FIG. 4 is a schematic structural exploded diagram of the top cover assembly according to an embodiment of the present disclosure.
Figure 5:
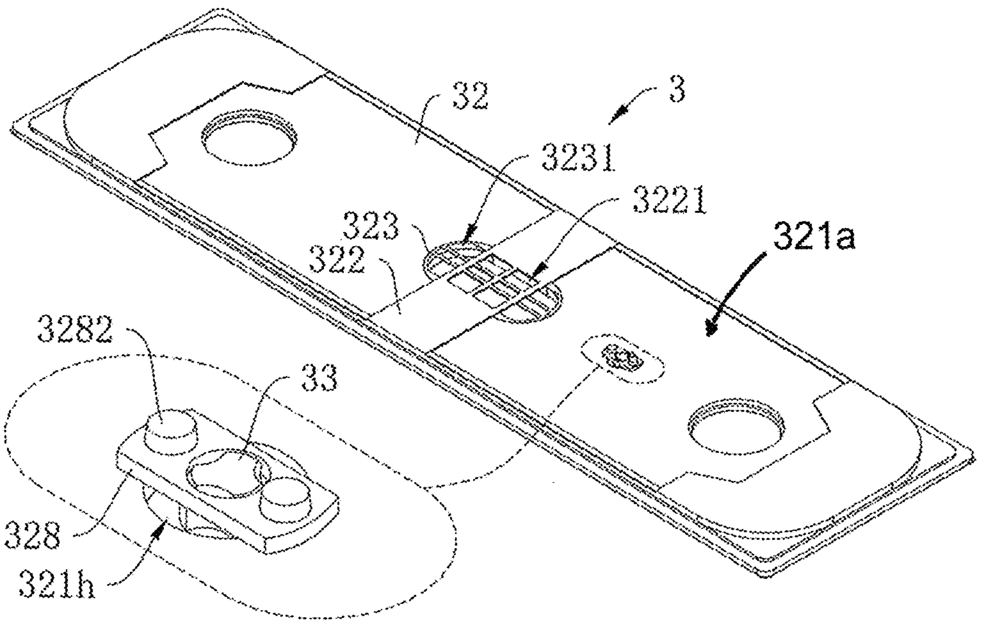
FIG. 5 is a schematic structural diagram of a top cover assembly in another view according to an embodiment of the present disclosure.

Referring to FIG. 3 and FIG. 5, a second aspect of the present disclosure discloses a top cover assembly. The top cover assembly 3 includes a top cover plate 31 and the lower plastic member 32 as described above. The lower plastic member 32 of the lower plastic member 32 is connected to the top cover plate 31. The first boss 322 and the second boss 323 are both located on the side of the lower plastic member 32 facing away from the top cover plate 31. It can be understood that the top cover assembly 3 with the lower plastic member 32 described above can bring the same or similar beneficial effects. For details, reference will be made to the previous descriptions, which will not be repeated here.

In some embodiments, a ratio of a thickness of the lower plastic member 32 to a thickness of the top cover plate 31 is D, $0.25 \leq D \leq 0.75$, such as D=0.25, 0.30, 0.35, 0.40, 0.45, 0.50, 0.55, 0.60, 0.65, 0.70, 0.75 or the like. The thickness of the lower plastic member 32 refers to a size of the lower plastic member 32 in a direction from the top cover plate 31 to the lower plastic member 32, for example, a size of the lower plastic member 32 in the down direction in FIG. 4. The thickness of the top cover plate 31 refers to a size of the top cover plate 31 in the direction from the top cover plate 31 to the lower plastic member 32, for example, a size of the top cover plate 31 in the down direction in FIG. 4.

It can be seen that in order to realize insulation of the electrode assembly from the housing, an insulation sheet is wrapped at a periphery of the electrode assembly and is in hot-melting connection with a peripheral side surface of the lower plastic member 32, so as to wrap around the battery cell. In this connection way, the electrode assembly can be suspended through the insulation sheet and the lower plastic member 32. By means of defining the thickness ratio relationship between the lower plastic member 32 and the top cover plate 31, on the one hand, it can be ensured that the lower plastic member 32 has sufficient strength and toughness to improve the bearing capacity of the lower plastic member 32 and avoid the problem of breakage of the lower plastic member 32 due to the vibration of the energy storage device during the transportation, which is conducive to prolonging the service life of the lower plastic member 32. On the other hand, an area of the peripheral side surface of the lower plastic member 32 can be enlarged, so that a large hot-melting connection area can be formed between the lower plastic member 32 and the insulation sheet, thereby achieving stable connection between the insulation sheet and the lower plastic member 32.

Figure 2:
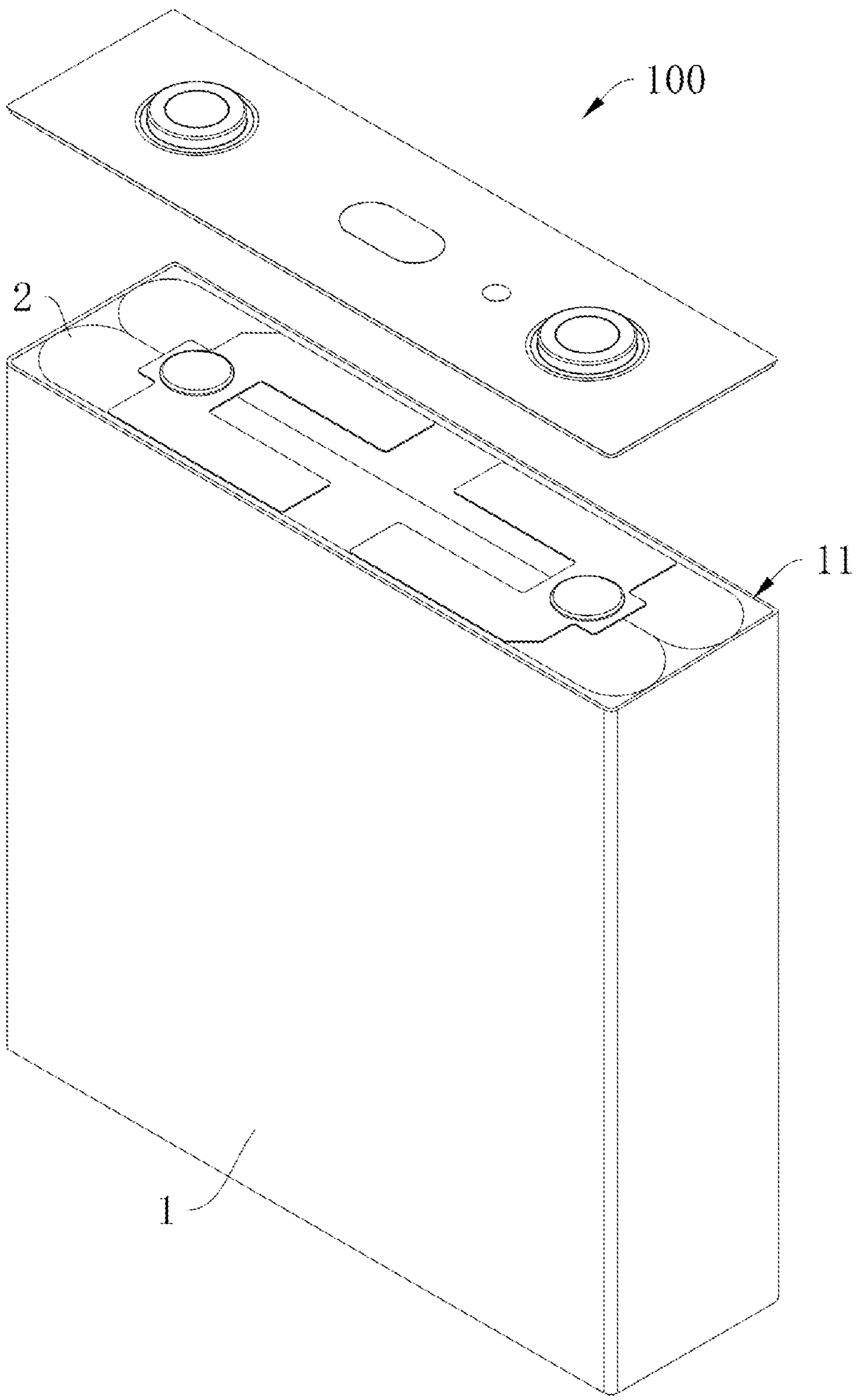
FIG. 2 is a schematic structural exploded diagram of the energy storage device according to an embodiment of the present disclosure.

As shown in FIG. 1 and FIG. 2, a third aspect of the present disclosure discloses an energy storage device. The energy storage device 100 is provided with a housing 1, an electrode assembly 2 and the top cover assembly 3 as described above. The housing 1 is provided with an opening 11. The electrode assembly 2 is arranged in the housing 1. The top cover plate 31 is hermetically connected to the opening 11 of the housing 1, and the lower plastic member 32 is arranged toward the electrode assembly 2.

It can be understood that the energy storage device 100 may include, but is not limited to, a cell, a battery module, a battery pack, a battery system, etc. When the energy storage device 100 is a cell, it may be a square cell.

A fourth aspect of the present disclosure discloses electrical equipment, which includes the energy storage device of the third aspect.

The technical solutions of the embodiments of the present disclosure are all applicable to various kinds of electric equipment using energy storage devices, such as an electric bicycle, an electric toy, an electric tool, an electric vehicle, ship and space vehicle, a mobile phone, portable equipment, a laptop, or a notebook.

The lower plastic member, the top cover assembly, the energy storage device and the electrical equipment disclosed in the embodiments of the present disclosure are described in detail above. Specific examples are used herein to illustrate the principle and implementations of the present disclosure. The descriptions of the above embodiments are only used to help understand the lower plastic member, the top cover assembly, the energy storage device and the electrical equipment of the present disclosure and core ideas thereof. Moreover, for those of ordinary skill in the art, according to the ideas of the present disclosure, there will be changes in the specific implementations and the scope of application. In summary, the content of this specification should not be construed as limiting the present disclosure.

What is claimed is:

1. A top cover assembly comprising: a top cover plate, a lower plastic member connected to the top cover plate, and a sealing member; wherein the top cover plate is provided with an injection hole penetrating therethrough; wherein the sealing member seals the injection hole; the lower plastic member comprising:

a first surface that faces away from the top cover plate; and a second surface facing away from the first surface, wherein the second surface is formed with a groove, wherein the first surface is provided with a first boss protruding therefrom, the first boss is provided with a first air vent, and the first air vent communicates with the groove;

wherein the first surface is further provided with a second boss protruding therefrom, the second boss is provided with a second air vent communicating with the groove, and a height of the second boss protruding from the first surface is less than a height of the first boss protruding from the first surface;

wherein the lower plastic member further comprises a blocking piece; the lower plastic member is provided with a first through hole corresponding to the injection hole; the first through hole penetrates through the first surface and the second surface; the blocking piece is arranged at the first through hole; and the blocking piece is connected to the first surface;

wherein the blocking piece is provided with a second through hole communicating with the first through hole; the sealing member is arranged in the injection hole, the first through hole and the second through hole in a penetrating manner in sequence along a direction from the second surface to the first surface; one end of the sealing member is located outside the second through hole;

wherein the blocking piece has a third side surface facing away from the lower plastic member; the third side surface is provided with at least one protrusion protruding therefrom; and a height of the at least one protrusion protruding from the third side surface is greater than or equal to a height of the one end of the sealing member extending beyond the third side surface;

wherein the blocking piece has a contacting surface opposite the third side surface and the contacting surface is in direct contact with the first surface of the lower plastic member and is arranged to overlap and block at least a portion of the first through hole, and a cross-sectional area of the first through hole cut by a plane perpendicular to an axis of the first through hole is larger than an overlap area between the blocking piece and the first through hole; and wherein the second through hole penetrates the blocking piece from the contacting surface through the third side surface.

2. The top cover assembly according to claim 1, wherein:

the first air vent penetrates through a surface of the first boss facing away from the lower plastic member, and a proportion of an air permeability area of the first air vent to an area of the surface of the first boss is greater than or equal to 15% and less than or equal to 25%; and/or the second air vent penetrates through a surface of the second boss facing away from the lower plastic member, and a ratio of an air permeability area of the second air vent on the surface of the second boss to the air permeability area of the first air vent on the surface of the first boss is 0.88 to 1.22.

3. The top cover assembly according to claim 1, wherein:

the lower plastic member comprises a first edge and a second edge;

the first edge and the second edge are respectively located at both ends of the lower plastic member along a lengthwise direction of the lower plastic member;

the first surface is further provided with a third boss and a fourth boss protruding therefrom;

the third boss is arranged on the first surface and extends along the first edge;

the fourth boss is arranged on the first surface and extends along the second edge; and the first boss is located between the third boss and the fourth boss.

4. The top cover assembly according to claim 3, wherein:

the third boss has a third boss first surface arranged remote from the first surface of the lower plastic member and a third boss second surface connected with an edge of the third boss first surface;

the third boss second surface is arranged toward the first boss;

the third boss first surface is provided with a first slot penetrating through the third boss second surface, and a first chamfer is arranged at a junction of a wall surface of the first slot and the third boss second surface;

the fourth boss has a fourth boss third surface arranged remote from the first surface of the lower plastic member and a fourth boss fourth surface connected with an edge of the fourth boss third surface;

the fourth boss fourth surface is arranged toward the first boss;

the fourth boss third surface is provided with a second slot penetrating through the fourth boss fourth surface; and a second chamfer is arranged at a junction of a wall surface of the second slot and the fourth boss fourth surface.

5. The top cover assembly according to claim 3, wherein:

the first surface is further provided with a first reinforcing rib and a second reinforcing rib protruding therefrom;

the first reinforcing rib is connected between the first boss and the third boss, and a height of the first reinforcing rib protruding from the first surface is less than the height of the first boss protruding from the first surface;

the second reinforcing rib is connected between the first boss and the fourth boss; and a height of the second reinforcing rib protruding from the first surface is less than the height of the first boss protruding from the first surface.

6. The top cover assembly according to claim 1, wherein two protrusions are provided, which are arranged at an interval around the axis of the first through hole.

7. The top cover assembly according to claim 1, wherein the at least one protrusion at least blocks part of the second through hole.

8. The top cover assembly according to claim 7, wherein:

the first through hole is circular;

the blocking piece comprises a peripheral surface formed by sequentially connecting a first flat surface, a first curved surface, a second flat surface and a second curved surface end to end;

the first flat surface is parallel to the second flat surface;

a distance between the first flat surface and the second flat surface is less than a diameter of the first through hole; and the first curved surface and the second curved surface are respectively located on both sides of the first through hole, so that the blocking piece blocks part of the first through hole.

9. The top cover assembly according to claim 1, wherein:

a bottom surface of the groove is an inclined plane;

the inclined plane has a first boundary line and a second boundary line in an extending direction of the first boss;

the second boundary line is closer to the first air vent than the first boundary line;

the inclined plane extends obliquely from the first boundary line to the second boundary line along a first direction; and the first direction is configured as a protruding direction of the first boss protruding from the first surface, and the extending direction of the first boss is configured as a direction perpendicular to the first direction.

10. The top cover assembly according to claim 1, wherein:
an extending direction of the second boss and an extending direction of the first boss form an angle;
the extending direction of the first boss is configured as a direction perpendicular to a first direction; and
the first direction is configured as a protruding direction of the first boss protruding from the first surface.

11. The top cover assembly according to claim 1, wherein a ratio of a thickness of the lower plastic member to a thickness of the top cover plate is D, $0.25 \leq D \leq 0.75$.

12. The top cover assembly according to claim 1, wherein the second through hole is coaxial with the first through hole, and the sealing member protrudes sequentially through the first through hole and then through the second through hole and extends away from the third side surface.

13. The top cover assembly according to claim 1, wherein the third side surface faces away from the lower plastic member and the at least one protrusion protrudes in a direction away from the third side surface and the lower plastic member.

14. An energy storage device comprising:
a housing;
an electrode assembly; and
the top cover assembly according to claim 1,
wherein:
the housing is provided with an opening;
the electrode assembly is arranged in the housing;
the top cover plate is hermetically connected to the opening; and
the lower plastic member is arranged toward the electrode assembly.

15. Electrical equipment comprising the energy storage device according to claim 14.

* * * * *